US010601744B2

(12) United States Patent
Sirpal et al.

(10) Patent No.: US 10,601,744 B2
(45) Date of Patent: Mar. 24, 2020

(54) SYSTEM AND METHODS FOR PRESENTATION OF A USER INTERFACE AND CARD ELEMENTS

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao, P.R.C. (CN)

(72) Inventors: Sanjiv Sirpal, Oakville (CA); Mohammed Selim, Oakville (CA); Alexander De Paz, Burlington (CA); Salvador Soto, Toronto (CA); Sergii Grysenko, Burlington (CA); Stephen Edwards, Hamilton (CA)

(73) Assignee: Qingdao Hisense Electronics Co., Ltd., Qingdao (CN)

( * ) Notice: Subject to any disclaimer, the term of this patent is extended or adjusted under 35 U.S.C. 154(b) by 471 days.

(21) Appl. No.: 14/829,986

(22) Filed: Aug. 19, 2015

(65) Prior Publication Data

US 2016/0231881 A1 Aug. 11, 2016

Related U.S. Application Data

(60) Provisional application No. 62/113,225, filed on Feb. 6, 2015.

(51) Int. Cl.
*H04L 12/58* (2006.01)
*H04L 29/08* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC .... G06F 3/0486; G06F 3/0482; G06F 3/1454; G06F 3/0481; G06F 3/1415; G06F 3/017;
(Continued)

(56) References Cited

U.S. PATENT DOCUMENTS 5,726,883 A * 3/1998 Levine ................... G06F 3/033
700/83
6,452,609 B1 * 9/2002 Katinsky ........... G06F 17/30053
707/E17.001

(Continued)

*Primary Examiner* — Andrew L Tank
(74) *Attorney, Agent, or Firm* — Gordon & Rees LLP

(57) ABSTRACT

The present disclosure relates to user interfaces for applications and in particular, presentation of card content by a user interface. In one embodiment, a process for presentation of a user interface includes detecting selection of a first graphical element, loading a framework file for presentation of content associated with the first graphical element, detecting selection of second graphical element presented by the user interface, and presenting card content for the second graphical element based on the framework file. The processes and devices described herein may be configured to preloading a framework file for presentation of content associated with one or more card elements.

19 Claims, 11 Drawing Sheets

(51) Int. Cl.

| | |
|---|---|
| *H04N 21/4402* | (2011.01) |
| *H04N 21/442* | (2011.01) |
| *H04N 21/45* | (2011.01) |
| *H04L 12/24* | (2006.01) |
| *G06F 3/0486* | (2013.01) |
| *G06F 3/14* | (2006.01) |
| *G06F 3/0482* | (2013.01) |
| *G06F 3/0484* | (2013.01) |
| *G06F 3/0485* | (2013.01) |
| *G06F 3/0488* | (2013.01) |
| *G06F 3/0481* | (2013.01) |
| *G06F 3/01* | (2006.01) |
| *G09G 5/00* | (2006.01) |
| *H04N 21/426* | (2011.01) |
| *H04N 21/458* | (2011.01) |
| *H04N 21/482* | (2011.01) |
| *H04N 21/488* | (2011.01) |
| *H04N 21/81* | (2011.01) |
| *H04L 12/28* | (2006.01) |

(52) U.S. Cl.
CPC .......... *G06F 3/0482* (2013.01); *G06F 3/0485* (2013.01); *G06F 3/0486* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G06F 3/1454* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(58) Field of Classification Search
CPC ............ G06F 3/04883; G06F 3/04847; G06F 3/0485; G06F 3/04845; G06F 3/04842; H04L 51/046; H04L 12/2807; H04L 41/12; H04L 41/0806; H04L 67/306; H04L 67/303; H04N 21/4516; H04N 21/44227; H04N 21/4402; H04N 21/812; H04N 21/4882; H04N 21/4826; H04N 21/42654; G09G 5/005; G09G 2354/00
See application file for complete search history.

(56) References Cited

U.S. PATENT DOCUMENTS

| | | | | |
|---|---|---|---|---|
| 7,320,007 | B1* | 1/2008 | Chang | G06F 17/248 707/694 |
| 7,789,305 | B2* | 9/2010 | Howcroft | H04N 5/44591 235/386 |
| 8,103,742 | B1* | 1/2012 | Green | G06F 17/30893 709/218 |
| 8,166,400 | B2* | 4/2012 | Todd | G06F 17/30905 715/729 |
| 8,966,375 | B2* | 2/2015 | Wasko | G06F 3/0482 715/740 |
| 10,114,622 | B2* | 10/2018 | Colletti | G06F 8/38 |
| 2002/0104096 | A1* | 8/2002 | Cramer | H04N 7/17318 725/113 |
| 2004/0187090 | A1* | 9/2004 | Meacham | G06F 8/38 717/103 |
| 2007/0039036 | A1* | 2/2007 | Sullivan | H04N 7/163 725/133 |
| 2007/0055938 | A1* | 3/2007 | Herring | G06F 17/30905 715/729 |
| 2007/0082707 | A1* | 4/2007 | Flynt | G06F 3/0481 455/564 |
| 2007/0115839 | A1* | 5/2007 | Yang | H04N 1/00204 370/251 |
| 2009/0282360 | A1* | 11/2009 | Park | G06F 3/0482 715/786 |
| 2009/0322790 | A1* | 12/2009 | Behar | G06F 1/162 345/659 |
| 2010/0088404 | A1* | 4/2010 | Mani | H04L 67/125 709/224 |
| 2010/0138763 | A1* | 6/2010 | Kim | G06F 1/1626 715/765 |
| 2010/0199194 | A1* | 8/2010 | Kumar | G06F 8/656 715/760 |
| 2010/0333008 | A1* | 12/2010 | Taylor | G06F 3/0486 715/769 |
| 2011/0047187 | A1* | 2/2011 | Sinha | G06F 9/543 707/802 |
| 2011/0072366 | A1* | 3/2011 | Spencer | G06Q 40/04 715/757 |
| 2011/0271332 | A1* | 11/2011 | Jones | H04L 9/3247 726/7 |
| 2012/0151418 | A1* | 6/2012 | Conzola | G06F 17/30637 715/853 |
| 2013/0057587 | A1* | 3/2013 | Leonard | G06F 3/0488 345/660 |
| 2014/0006967 | A1* | 1/2014 | Arumugam | G06F 9/54 715/748 |
| 2014/0032722 | A1* | 1/2014 | Snow | G06F 9/4445 709/220 |
| 2015/0128105 | A1* | 5/2015 | Sethi | G06F 8/36 717/106 |
| 2015/0180912 | A1* | 6/2015 | Dufour | H04W 4/02 715/753 |
| 2015/0212675 | A1* | 7/2015 | Firstenberg | G06F 3/0484 715/747 |

\* cited by examiner

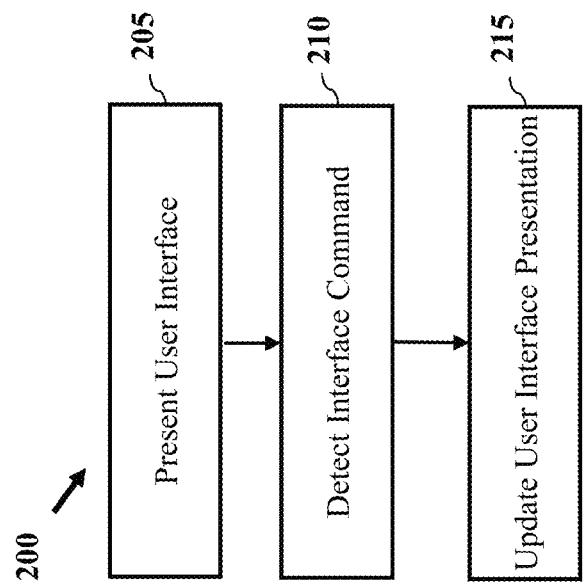

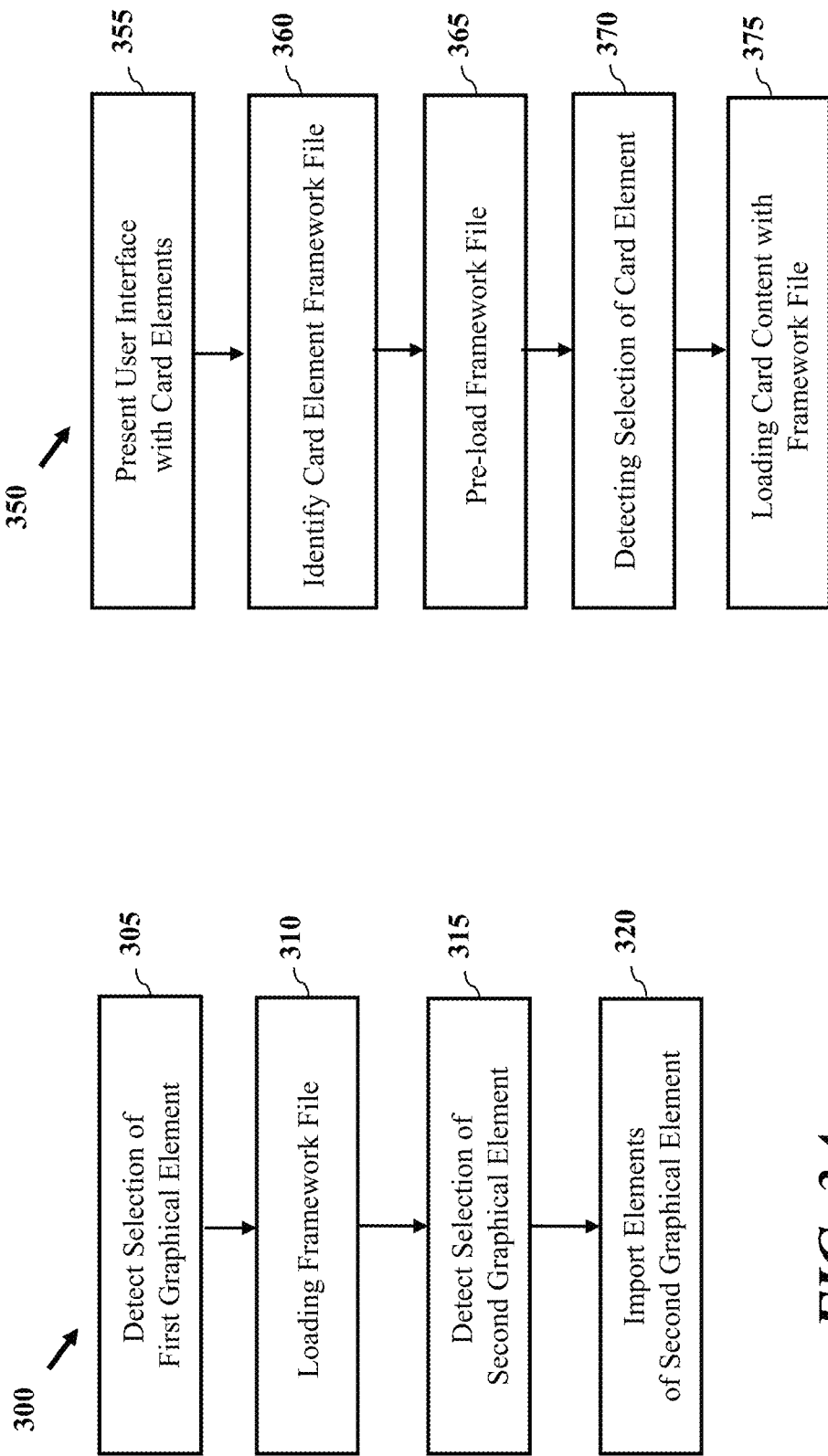

SYSTEM AND METHODS FOR PRESENTATION OF A USER INTERFACE AND CARD ELEMENTS

CROSS-REFERENCE TO RELATED APPLICATIONS

This application claims priority to U.S. Provisional Application No. 62/113,225 titled SYSTEM AND METHODS FOR AN APPLICATION CONFIGURATION AND PRESENTATION filed on Feb. 6, 2015, the content of which is expressly incorporated by reference in its entirety.

This application is related to the concurrently filed applications entitled: SYSTEM AND METHODS FOR APPLICATION USER INTERFACE PRESENTATION AND CARD ELEMENTS filed on Aug. 19, 2015 and assigned patent application Ser. No. 14/829,886; SYSTEM AND METHODS FOR CARD ELEMENT APPLICATION OPERATION filed on Aug. 19, 2015 and assigned patent application Ser. No. 14/829,893; SYSTEM AND METHODS FOR CARD EXCHANGE AND USER INTERFACE PRESENTATION filed on Aug. 19, 2015 and assigned patent application Ser. No. 14/829,904; SYSTEM AND METHODS FOR CONTROL OF CARD ELEMENTS WITHIN AN APPLICATION USER INTERFACE filed on Aug. 19, 2015 and assigned patent application Ser. No. 14/829,914; SYSTEM AND METHODS FOR CARD INTERACTION AND ASSIGNING CARDS TO DEVICES filed on Aug. 19, 2015 and assigned patent application Ser. No. 14/829,923; SYSTEM AND METHODS FOR CARD INTERACTION AND ASSIGNING CARDS TO SPACES filed on Aug. 19, 2015 and assigned patent application Ser. No. 14/829,930; SYSTEMS AND METHODS FOR CONNECT TO CONTROL filed on Aug. 19, 2015 and assigned patent application Ser. No. 14/829,942; SYSTEMS AND METHODS FOR DEVICE TO DEVICE CONTROL filed on Aug. 19, 2015 and assigned patent application Ser. No. 14/829,955; SYSTEM AND METHODS FOR SETTINGS CARDS filed on Aug. 19, 2015 and assigned patent application Ser. No. 14/829,970, the disclosures of which are expressly incorporated by reference.

FIELD

The present disclosure relates to application user interfaces, and in particular, presentation of card content by a user interface.

BACKGROUND

Technologies associated with network devices, and in particular personal devices, are implemented in various forms and accessible from many sources. Services for mobile communication can allow for portability of devices. While conventional systems allow for mobility, there are limitations on devices and device configurations. With respect to local networks, system components are also limited in many ways. Many conventional devices are not interoperable with other devices or network services. Connectivity of devices, or the lack connectivity, in conventional systems can be a major drawback. Many user devices must be configured to interact with one another. In many cases, conventional communication protocols and configurations do not allow for connectivity or exchange. Similarly, in many cases, devices and applications may operate with unreasonable delays.

BRIEF SUMMARY OF THE EMBODIMENTS

Disclosed and claimed herein are systems, methods and devices for user interface control, and in particular, presentation of card content by a user interface. In one embodiment, a method includes detecting, by a device, selection of a first graphical element presented by a user interface, wherein the user interface is configured to present a graphical user interface for display on a device including graphical elements for one or more card elements, and loading, by the device, a framework file for presentation of content associated with the first graphical element, wherein the first graphical element is associated with a card element configured to be presented based on the framework file and card content for the first graphical element. The method also includes detecting, by the device, selection of second graphical element presented by the user interface, wherein the second graphical element is associated with a second card element, and presenting, by the device, card content for the second graphical element based on the framework file.

In one embodiment, the user interface is presented for an application configured for at least one of presentation, interaction and exchange of card elements within the application.

In one embodiment, card elements are configured to include at least one of content and functionality.

In one embodiment, the selection of a first graphical element presented by a user interface includes an input command to access content associated with the card element.

In one embodiment, loading the framework file includes loading one or more network protocols for communication relative to a communication network.

In one embodiment, the framework file includes cross-platform and platform protocols.

In one embodiment, the framework file is executed by the device to enable network communication and interoperation with a platform of the device.

In one embodiment, selection of the second card element is an interaction within the user interface to access content of the second card element.

In one embodiment, presenting content for the second card element includes importing content associated with the second card element into the framework file.

In one embodiment, the second card element is associated with remote device accessible to the device by way of the application.

Another embodiment is directed to a method for presentation of card content by a user interface, the method including presenting, by a device, a user interface including graphical elements for one or more card elements. The method also includes identifying, by the device, a framework file for presentation of the graphical elements associated with the one or more card elements, wherein each card element is configured to be accessed based on the framework file and card content, and preloading, by the device, the framework file for presentation of content associated with the one or more card elements. The method also includes detecting, by the device, a selection of a card element presented by the user interface, and loading, by the device, card content for a selected card element based on the framework file.

In one embodiment, the user interface is presented for an application configured for at least one of presentation, interaction and exchange of card elements within the application.

In one embodiment, card elements are configured to include at least one of content and functionality.

In one embodiment, the selection of a card element presented by a user interface includes an input command to access content associated with the card element.

In one embodiment, loading the framework file includes loading one or more network protocols for communication relative to a communication network.

In one embodiment, the framework file includes cross-platform and platform protocols.

In one embodiment, the framework file is executed by the device to enable network communication and interoperation with a platform of the device.

In one embodiment, the second card element is associated with remote device accessible to the device by way of the application.

Another embodiment is directed to a device including a display configured for presentation of a user interface and a controller coupled to the display. The controller is configured to detect selection of a first graphical element presented by a user interface, wherein the user interface is configured to present a graphical user interface for display on a device including graphical elements for one or more card elements and load a framework file for presentation of content associated with the first graphical element, wherein the first graphical element is associated with a card element configured to be presented based on the framework file and card content for the first graphical element. The controller is configured to detect selection of second graphical element presented by the user interface, wherein the second graphical element is associated with a second card element, and present card content for the second graphical element based on the framework file.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2 depicts a process for updating user interface presentation according to one or more embodiments;

FIGS. 3A-3B depict processes for presentation of a user interface according to one or more embodiments;

DETAILED DESCRIPTION OF THE EXEMPLARY EMBODIMENTS

Overview and Terminology

Figure 1A:
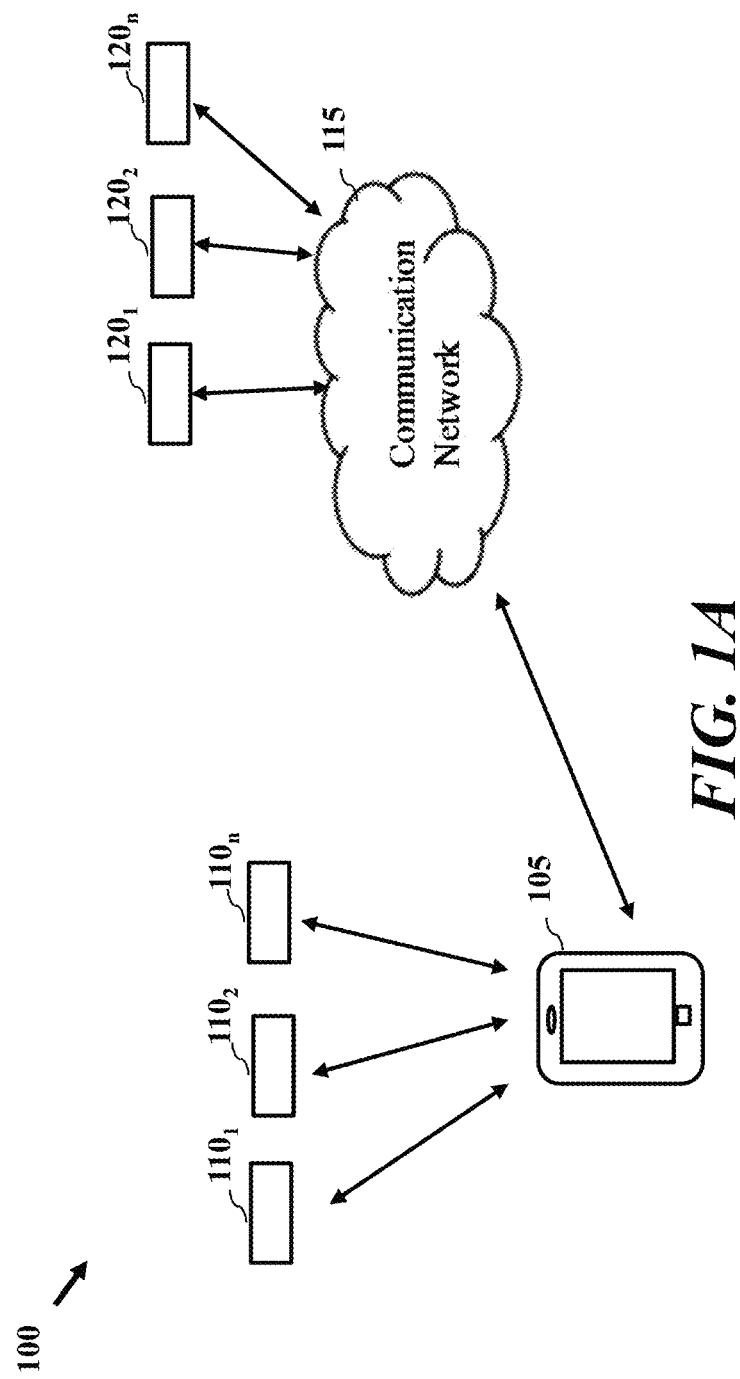
FIG. 1A depicts a graphical representation of a simplified system diagram according to one or more embodiments.

One aspect of this disclosure relates to a method of presentation of a user interface, and in particular, preloading card elements and framework files for presentation of card elements in a user interface. In one embodiment, a mobile operating system/experience (MOX) application may provide card application preloading. The application may involve one or more processes performed across a system and/or devices for presentation of content on a user interface based on preloading and dynamic web importing.

One aspect of the disclosure is to provide methods and devices for card interaction and assigning cards to devices. In one embodiment, a MOX application is provided for card interaction and assigning cards. In another embodiment, a device is disclosed for facilitating card interaction and assigning cards.

One or more embodiments described herein are directed to communication with devices and interoperability of devices by way of an application configured to execute on the one or more devices. The application, which may be a MOX application, may be configured to present a user interface with graphical elements to represent entities (e.g., devices, spaces, etc.) and card elements. The user interface may also be configured to allow for manipulation of the card elements, such that assignment of a card to a device within the user interfaces results in an association of a card element to the device within the application. In that fashion, representations in the user interface can result in associations of data by devices running the application (e.g., MOX application).

As used herein, a card can relate to graphical elements displayed in a user interface, wherein each card element can allow for one or more of exchange, communication, control and/or application accessibility. Card elements may be associated with one or more types of cards and one or more types of capabilities. A card element may have a data structure associated with each card type, the card providing metadata that can allow an application and/or devices to utilize the card. According to one embodiment, each card element can include a graphical element that is represented by a device and/or can include a data record stored by one or more servers or devices that allow for the card to be shared, transmitted, loaned, exchanged, associated, pulled and/or pushed to one or more devices and spaces. Card elements may define capabilities of devices and/or spaces. Card elements may be associated with devices or spaces that are real or virtual. Card elements may be uniquely identified.

As used herein, a MOX application relates to an application having particular core elements that allow for the application to be executed across many different devices and device types. The application may be platform agnostic and thus, configurable on one or more operating systems or platform types (e.g., linux, etc.). The MOX application provides connectivity, control and/or communication relative to one or more devices. The MOX application can be operated based on communication with a network and/or peer-to-peer communication among devices. The MOX application may operate within a network or system that is an ecosystem or MOX ecosystem. The MOX application may be deployed on one or more devices, entities or spaces that make up a MOX ecosystem.

According to one embodiment, the MOX system is an application that runs on a mobile device. According to another embodiment, MOX provides a unique user interface with many features. Features of the MOX application can be characterized as user interface (e.g., user experience) features and architectural features. The MOX system incorporates cards. Cards are displayed as visual elements in the user interface that can be manipulated to provide exchange of data, capabilities, and allow for device control. Card elements may be configured as containers.

As used herein, an entity relates to elements that that are recognized and that make up an ecosystem of the application. An entity may relate to a device, space, and users of an application. An ecosystem relates to collections of entities that are associated.

Spaces relate to real and virtual locations that are recognized by the application. By way of example, a space may be assigned to one or more of a room, building, floor, home, office or other physical location (e.g., café, office, etc.). Spaces may also be assigned to virtual locations that do not have a corresponding physical location.

A device can relate to devices configured to execute and run a MOX application. A device can also relate to non-MOX devices. Devices may refer to real and virtual devices.

Architectural aspects of the MOX application relate to the card configuration, platform for operating with mobile device OS, and underlying processes for card exchange functionality.

One embodiment is directed to processes for presentation of a user interface and a device configured to present a user interface, such as MOX, with cards.

Another embodiment is directed to an application platform, processes and devices for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. May be configured to publish card into any device (virtual or real).

MOX may operate based on independently defined APIs, which are available via a RESTful interface (similar to the cloud interface). The APIs may be defined by an OEM to support the device.

In certain embodiments, a MOX card itself is an HTML object, containing relevant resources related to color pallet, and branding, as well as the interactive components. Both the front and the back of the card are supplied by the device itself, and are validated by the cloud.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1A depicts a graphical representation of a simplified system diagram according to one or more embodiments. System 100 may be configured for presentation of an application by device 105. By way of example, system 100 includes one or more devices that may be configured with similar core elements to allow for an application to reside on one or more devices for connectivity, communication, exchange and/or control relative to the devices. Based on the application, device 105 may communicate and interoperate with one or more other devices, such as devices $110_{1-n}$. According to another embodiment, device 105 may communicate and interoperate with one or more other devices, such as devices $120_{1-n}$ by way of a communication network 115. System 100 may be configured to allow for control and communication by device 105 with one or more of devices $110_{1-n}$.

Device 105 may be configured to execute an application, such as a MOX application providing one or more functions, including but not limited to viewing of cards associated with the user device, viewing other devices and cards associated with other devices, exchange of cards between the user device-exchange may be based on one or more of push/fling, pull and exchange of cards and contextual presentation of cards. The user interface may be configured to detect user commands of device 105 for assignment of cards to another device, such as devices $110_{1-n}$ and/or $120_{1-n}$.

According to one embodiment, device 105 is configured to run an application (e.g., a MOX application) configured to present a user interface. Device 105 includes memory and hardware configured to store and execute and application, such as a MOX application and to operate with one or more card elements. The MOX application may run across multiple devices of system 100, including multiple device types and across multiple device operating platforms.

According to one embodiment, devices $110_{1-n}$ relate to one or more devices in close proximity to device 105. Device 105 may be configured to communicate wirelessly with the devices $110_{1-n}$ by way of the MOX application. Devices $110_{1-n}$ relate to devices associated with a particular space and/or ecosystem. Accordingly, a user interface may identify and/or include graphical elements for devices $110_{1-n}$ and for card elements of devices $110_{1-n}$. Devices $120_{1-n}$ relate to devices which may be communicated with over communication network 115 via the user interface of the MOX application. Devices $120_{1-n}$ may relate to devices in close proximity or distances from device 105. Devices $120_{1-n}$ may relate to electronic devices. In some embodiments, devices $120_{1-n}$ include one or more servers.

Device 105 may run a MOX application that allows for detection of user input/touch command of a graphical element and movement from one section of the display to another section where the graphical element is a card element, and how the system processes the movement (exchange, interact, control, etc.). Movement of cards within the user interface call allow for assignment of a card to a device.

The MOX application can allow for one or more of card presentation, association of cards and entities (e.g., devices, virtual devices), transition of card and/or entities with respect to user actions or spaces, display of cards based on capability matching, selection of which cards to display, user and device avatars, a summary view and detailed view of card, and card comments.

Device 105 may present/provide a user interface and MOX application to allow for hanging cards on devices, controlling devices using cards, borrowing services (e.g., Wi-Fi) using cards, capability sharing (e.g., sharing control of a device), and one or more features built around sharing cards. Device 105 may detect user input/touch commands of a graphical element and movement from one section of the display to another section where the graphical element is a card element. The MOX application processes movement of cards (exchange, interact, control, etc.).

Device 105 includes a display configured to present a user interface and a controller coupled to the display. The controller is configured to present a user interface. An exemplary representation of a user interface is depicted in FIG. 3 according to one or more embodiments. The user interface is presented including graphical elements for one or more card elements, graphical elements for one or more spaces and devices, such as devices $110_{1-n}$ and devices $120_{1-n}$.

Architectural aspects of the MOX application can include providing card configurations, providing a platform for operating with mobile device operating systems (OS), and underlying processes for card exchange functionality within the MOX application.

Device 105 may be a mobile device or tablet executing an application, such as the MOX application executed by device 105. Although FIG. 1A depicts one device 105, it should be appreciated that system 100 and the application may allow for multiple devices to communicate and interoperate.

System 100 may include a server, wherein one or more of devices $120_{1-n}$ may relate to servers. Device 105 may be configured to communicate with the server of system 100. The device is configured to present a user interface including graphical elements for one or more card elements, detect a user interface command to associate a selected card element presented by the user interface with a selected space presented by the user interface, and output a communication to the server including an association of the selected card element with the selected space, wherein the association of the selected card with the selected space includes updating metadata for the card element.

Figure 1B:
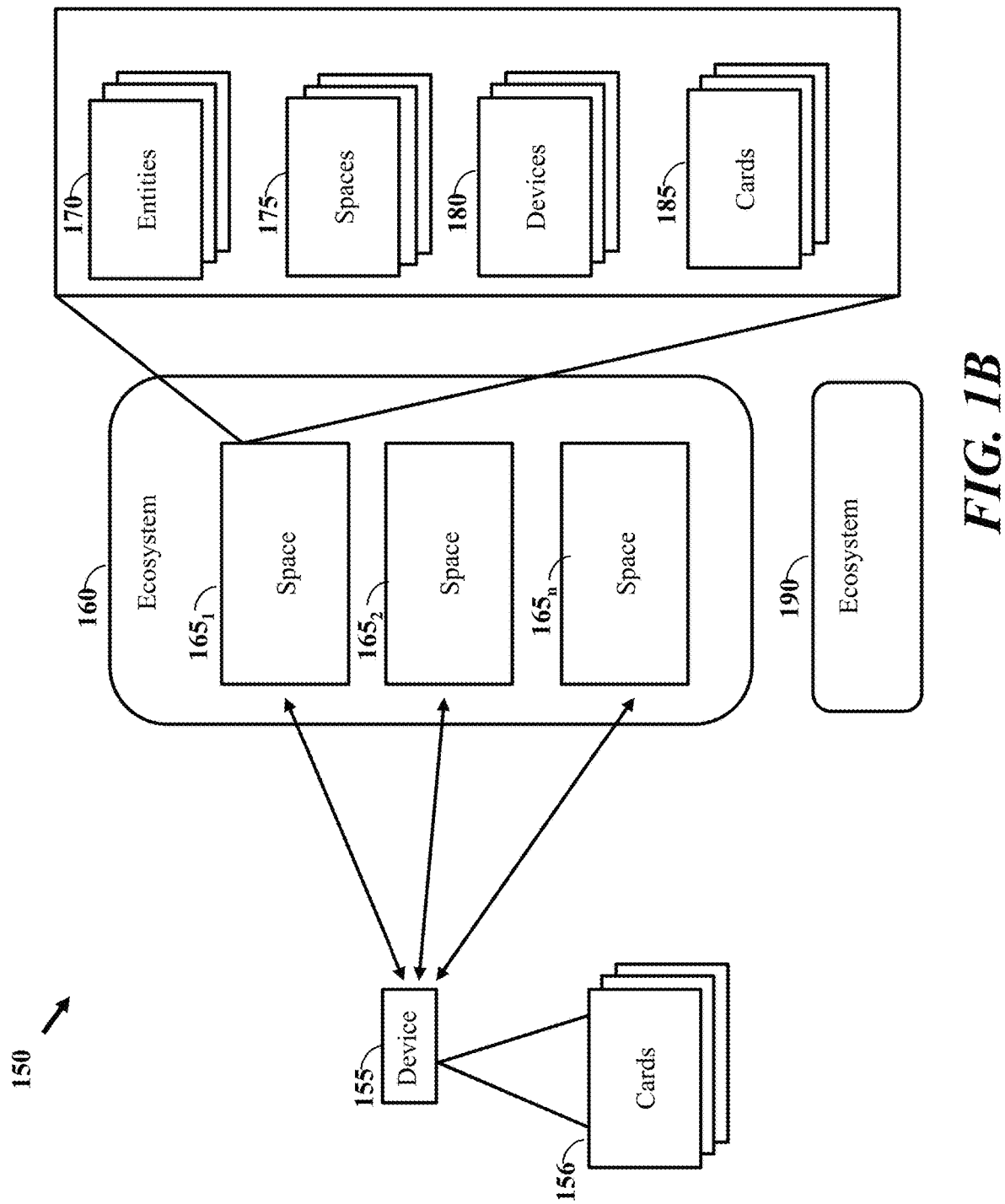
FIG. 1B depicts a graphical representation of system entities according to one or more embodiments.

FIG. 1B depicts a graphical representation of system entities according to one or more embodiments. According to one or more embodiments, an application or electronic platform is provided for communication, control and exchange based on one or more associations. FIG. 1B depicts a graphical representation of application entities for a MOX application system. A MOX system 150 can include a plurality of devices, such as device 155. System 150 depicts an exemplary representation of entities that can make up ecosystem of the application with respect to device 155. Device 155 may relate to a representation of device 105 of FIG. 1A.

Each device in system 150 can be associated with one or more ecosystems. Device 155 is associated with ecosystem 160. Within a MOX system, each device may be associated with different ecosystems. Ecosystems may be particular to a particular device or user. Ecosystem includes a plurality of spaces $165_{1-n}$. According to one embodiment, each of spaces $165_{1-n}$ may be associated with device 155 by user selection, location of device 155 and/or by system 150. A user interface of device 150 may display graphical elements associated with one or more of spaces $165_{1-n}$ based on the location and/or operation of the device. Spaces $165_{1-n}$ may be real or virtual locations. By way of example, spaces $165_{1-n}$ may be assigned to one or more of a room, building, floor, home, office or other physical location (e.g., café, office, etc.). Spaces $165_{1-n}$ may also be assigned to virtual locations that do not have a corresponding physical location. Each of spaces $165_{1-n}$ may be associated with one or more devices, such as device 155 for a user. Based the selection of a space or location of device 155, the user interface may present one or graphical elements for each space. In addition, device 155 may be configured to assign one or more cards to a device.

Card elements 156 are HTML objects, containing relevant resources related to color pallet, and branding, as well as the interactive components. Both the front and the back of the card are supplied by the device itself, and are validated by the cloud.

Each of spaces $165_{1-n}$ may include and/or be associated with a plurality of entities 170, spaces 175, devices 180, and cards 185. Entities 170 associated with a space, such as space $165_1$, can include MOX and non-MOX enabled devices, users, etc. Spaces 175 associated with a space, such as space $165_1$, can include one or more spaces associated based on location, card selection, user preferences/selections, etc. Devices 180 associated with a space, such as space $165_1$, can include MOX and non-MOX enabled devices, devices based on location, device assigned to a space etc. Cards 185 associated with a space, such as space $165_1$, can include one or more card elements associated by a user to a space, such as cards 156 or cards that may be available while within a space.

Ecosystem 190 may be another ecosystem that is not assigned to device 155. Device 155 may be configured to join or gain access to ecosystem 190 using a MOX application.

FIG. 2 depicts process 200 for presentation of a user interface according to one or more embodiments. Process 200 may be employed to for assigning card elements of an application user interface to a device or devices. Process 200 may be performed by a device such as device 105 of FIG. 1A. Process 200 may be configured to present a user interface at block 205. The user interface presented at block 205 may be associated with a MOX application. The user interface may be presented at block 205 including graphical elements for one or more card elements, graphical elements for one or more spaces, and graphical elements for one or more devices. In one embodiment, the user interface includes graphical elements for one or more devices in one portion of the user interface and the graphical elements for one or more card elements in a second portion of the user interface. For example, the devices may be icons or graphical elements presented in a top portion of the user interface. Each card element includes graphical display elements in the user interface configured to be manipulated within the user interface to allow for at least one of exchange of data, capabilities, and device control.

At block 210, an interface command is detected. The detected interface command may be to associate a selected card element presented by the user interface with a selected device presented by the user interface. In certain embodiments, the user interface command includes selection (e.g., tap, tactile, other, etc.) and movement of a graphical element for the selected card from a first position (e.g., the displayed position) in user interface to a second position associated with display of the selected device. The selected device may refer to physical or virtual locations.

At block 215, the application outputs a communication based on the detected interface command. According to one embodiment, outputting a communication includes the association of the selected card element with the selected device. Based on the association of the selected card with the selected device, metadata for the card element may be updated. Association may include transmission of card element metadata to the device. In one embodiment, updating metadata includes storing a unique identifier of the device with the card element metadata.

In one embodiment, assignment of the selected card element to the selected device may be based on a determination that the card element can be assigned to the device. For example, the application can determine whether the assignment conforms to at least one of capabilities of the device and card element constraints. The card application may determine that a card element cannot be assigned to a device and in response may display one or more elements to indicate that the assignment cannot be made. Following the output communication at block 215, user interface can continue to display the selected card element in the user interface following assignment to the selected device.

In one embodiment, process allows for exchange of data associated with the card to be provided to a device. The MOX application may be configured to allow for the data to be usable by one or other MOX devices. In this fashion, conventional methods of electronically sending that require end user addresses (e.g., email) are not required. Similarly, assignment does not require configuration, downloading, decompressing, other steps for the card to be useable once assigned. Rather, card assignment allows for the card element to appear within the user interface when the device to which the card is assigned is selected. In addition, one or more properties of the card element may be usable by the device to which the card is assigned.

FIG. 3A depicts process 300 for presentation of a user interface according to one or more embodiments. Process 300 may be employed for selecting first card element of a user interface for a device or devices and thereafter selecting a second card element. Process 300 may be preformed by a device such as device 105 of FIG. 1A. Process 300 may be configured to present a user interface and detect selection of first graphical element at block 305. Detecting a selection of first graphical element 305 may be associated with MOX application. Detecting a selection of a first graphical element 305 is presented by the user interface. User interface is configured to present a graphical user interface for display on a device. A graphical user interface can include visual environment for interaction which can be displayed on a device. A device can include but is not limited to a computer, television, mobile device, or appliance. Displaying graphical user interface on a device includes graphical elements for a plurality of card elements. Graphical elements are those elements used by graphical user interfaces (GUIs) to offer a consistent visual language to represent information stored in computers. Card elements are containers for one or more media, data, and micro-applications. Card elements are displayed and arranged on device user interface for easy access and interaction. Card elements are identified by custom metadata. Custom metadata can be at least structural metadata or descriptive metadata to identify card elements, content or function. Custom metadata can also be used to identify more than one card elements (e.g. a group of cards). Interaction with card elements can be a simple selection or an interactive gestors such as a swipe, pull, and flick. An interactive gestor can also be voice activation or execution of a verbal or non verbal command such as but not limited to clapping hands together.

At block 310, a selection of a first graphical element is detected and thereafter device loads a framework file. According to one embodiment, a framework file relates to a base web application or skeleton file. First graphical element can be associated with a card element configured to be presented based on the framework file and card content for the first graphical element. Loading a framework file can include the presentation of local or virtually saved content files. Local content files can reside on the device itself and virtual content file are not locally store but can be quickly accessed for loading. A framework file can include a webstack or more than one skeleton file. The framework file can also be shared or associated with multiple card elements. A loading layer protocol (e.g., protocol stack) can include but is not limited to HTML5, CSS, and JavaScript. Presenting the first graphical element associated with card element is achieved by loading framework file and card content. Card content can include HTML content or elements. Card content are content not present in framework file and are loaded simultaneously with framework file. According to one embodiment, a framework file may relate to one or more software configurations and/or components to run on or on top of a platform. A framework file as used herein may be configured based on one or more of a user interface, application, card element, zone, etc. Accordingly, a plurality of framework files and framework file configurations may be employed.

At block 315, a device has loaded a framework file from first graphical element and thereafter detects selection of a second graphical element. A user can choose a second graphical element associated with a second card element. Detecting a selection of second graphical element 315 presented by the user interface is configured to be presented based on the framework file and card content for the second graphical element. The second graphical element is detected is the same fashion as the first graphical element.

Finally at block 315, a selection of a second graphical element is detected and imports elements of second graphical element to be presented for a user interface. Importing elements for the second graphical element can include card content and framework file. In another embodiment importing elements of second graphical element can include card content and preloaded framework file 310 of first graphical element. Importing elements for a second graphical element can also include updated parts of web page not present in the framework file. Updating parts of web pages can be accomplished by but not limited to Asynchronous JavaScript and XML (AJAX). AJAX allows updating parts of a web page without reloading the whole page using HTML importing. HTML importing allows content within a card element to be updated with fresh content or data as needed. Card content and stock of protocols are simultaneously presented by user interface 300 on the device.

In another embodiment block 300 can includes reusing framework file 320 of a card that has already been selected or loaded. In another embodiment, user interface preloads framework file before card is selected (e.g., FIG. 4). In either embodiment, there is increase loading speed of the card and associated service. Process prevents loading (e.g., reloading, refreshing) of framework file each time a card is selected.

Selection of a card allows going from a summary view of card content to a detailed view quickly with minimal delay. Quickly moving from summary view to detailed view of card content is done dynamically with regard to display needs using core services of a device or interface. Core services can include but are not limited to AJAX. Processes can be used to determine assignability, movement or exchange of card within the MOX system.

FIG. 3B. depicts process 350 for presentation of a user interface according to one or more embodiments. Process 350 may be employed for presenting a user interface with card multiple card elements and selecting a card element to be displayed for the user. Process 350 may be preformed by a device such as device 105 of FIG. 1A. Process 350 may be configured to present a user interface with card elements at block 355. Presenting a user interface with card elements 350 may be associated with MOX application. Presenting a user interface with card elements 350 can include a graphical user interface for display on a device with a plurality of card elements. Similar to FIG. 3A, a user interface provides a graphical user interface that can include a visual environment for interaction and can be displayed on a device. A device can include but is not limited to a computer, television, mobile device, or appliance. Graphical elements are those elements used by graphical user interfaces (GUIs) to offer a consistent visual language to represent information stored in computers. Card elements are containers for one or more media, data, and micro-applications. Card elements are displayed and arranged on device user interface for easy access and interaction. Card elements are identified by custom metadata. Custom metadata can be at least structural metadata or descriptive metadata to identify card elements content or function. Custom metadata can also be used to identify more than one card elements (e.g. a group of cards). Interaction with card elements can be a simple selection or an interactive gestors such as a swipe, pull, and flick. An interactive gestor can also be voice activation or execution of a verbal or non verbal command such as but not limited to clapping hands together.

At block 360, device presents user interface with card element and thereafter identifies card element framework file. Identifying a framework file can be determined by selection and detection of a card element. The framework file is used for presentation of graphical elements associated with a card element. The framework file can be multiple web components. The framework file can include more than one layer of skeleton files and loading layer protocols. In another embodiment, the framework file can also be, but is not limited to, a webstack. The framework file provides a skeleton file as framework associated with a card element. Apache Cordova can enable iOS/Android applications to control web application components within a framework file. A loading layer protocol, such as Apache Cordova, can allow for providing a hook between protocols running in the webview and the native application. Loading layer protocol can include but is not limited to HTML5, CSS, and JavaScript. Framework file can also be shared or associated with multiple card elements. Card elements are configured to be presented by a device based on the framework file and card content. Card content can include HTML content or elements. Card content is content not present in framework file and is loaded simultaneously with framework file.

At block 365, after identifying a framework file associated with card element 360, device preloads framework file. Preloading a framework file can be determined by the identified card selection. Preloading framework file can include quick access to card content for card selections. In another embodiment, preloading framework file can include quick access to card content prior to selection of card element. Preloading a framework file can include the presentation of local or virtually saved content files. Local content files can reside on the device itself and virtual content file are not locally store but can be quickly accessed for loading. Content files can also include but are not limited to a Polymer element placed within the canvas of a native webview. In another embodiment webview can also be but not limited to Apache Cordova. Meaning the local or virtual content file can remain loaded in the webview for quick and easy access without loading a full page of content for a card element.

At block 370, framework file has been preloaded and thereafter detects a selection of a card element. Detection selection of card element can include a selection by a user. In another embodiment a card element can be selected by an interaction with card element. Interaction with card elements can be a simple physical (e.g., pushing), mental (e.g., cognitive decision), or visual selection (e.g., retinal activation). In another embodiment, interaction can also be an interactive gestors such as but not limited to a swipe, pull, and flick. In another embodiment, an interactive gestor can also be voice activation or execution of a verbal or non verbal command such as but not limited to clapping hands together.

Finally at block 375, selection of a card element has been detected and thereafter device loads card content with framework file 365. Loading card content includes updating parts of card elements not present in the framework file. Loading card content can include a webpage or other web-based content. Updating parts of card elements can be accomplished by but not limited to AJAX. AJAX allows updating parts of a web page without reloading the whole page using HTML importing. HTML importing allows content within a card element to be updated with fresh content or data as needed. HTML importing of content can be dynamically injected into preloaded framework file during loading based on card element needs. Injecting needed HTML content into preloaded framework file prevents loading of skeleton web framework architecture associated with card element. Instead framework file is already loaded to a native webview and card content are dynamically updated and simultaneously loaded to be displayed on device. Card content and framework file simultaneously presented by user interface 350 on the device provides quicker and more responsive load time with minimal latency.

Figure 4:
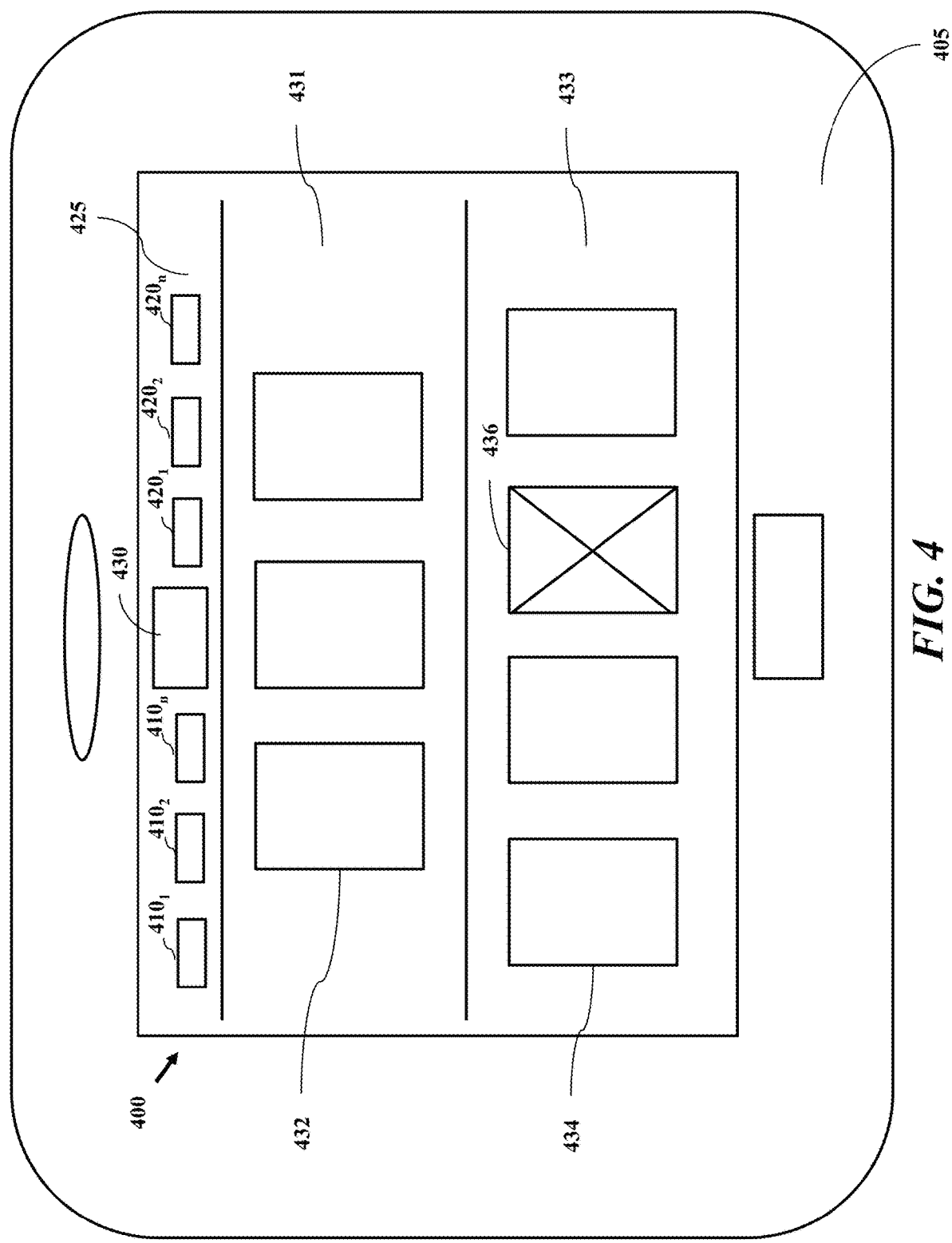
FIG. 4 depicts a graphical representation of a user interface according to one or more embodiments.

FIG. 4 depicts graphical representations of a user interface according to one or more embodiments. The user interface may be displayed on a user device 405. The user device 405 can be a cellular phone, an electronic tablet, an e-reader, a laptop computer, or any other device with control capabilities and a connection to a communication network. The user interface 400 is presented including graphical elements for one or more card elements including graphical elements for one or more spaces. Features of user interface 400 allow for one or more of viewing of cards associated with the user device, viewing other devices and cards associated with other entities (e.g., other devices, spaces), and exchange of cards between the user device and other devices. Exchange may be based on one or more of push/fling, pull and exchange of cards. The user interface also allows for contextual presentation of cards.

In one embodiment, user interface 400 may provide card interaction by way of an exchange view. A MOX application may provide processes and device for exchange of a card via a user interface (MOX). User interface features and processes for showing cards include a detailed view and summary view when selected, capability matching, communication of device features, devices indicating that services and capabilities are available, and associating content with any device so that content appears to reside on the device.

In one embodiment, MOX may provide card interaction including a push operation. The push operation may include one or more of a fling gesture of card, a profile card, settings card, cards in general, etc., hanging a card, capabilities (network access, temporary control of a device, guest features, etc.) capability matching, appearance of card transition.

In one embodiment, MOX may provide card interaction including a pull operation. The pull operation may include one or more of pulling a device card, borrowing capabilities, capability matching, pulling settings vs. pulling an app., pulling a card off of a device, appearance of card transition.

In one embodiment, MOX may provide card interaction including Assigning/associating cards to devices (virtual or connected). The operation may include one or more of a device that is connected or not is presented in the MOX UI and connection to the device (whether virtual or actual) based on card, processes for identification based on scanning, and searching for non-connected and connected devices, associating devices (connected or not with spaces), and creating a virtual equivalent.

In one embodiment, MOX may provide card interaction including Assigning cards to Space/Card Hanging. The operation may include one or more of processes and device where a card may be assigned to a space, including acts for flinging, pushing or hanging card to a space, presentation of the card on other devices, presenting cards based on a space that a device is in, card presentation based on geolocation.

One embodiment is directed to detection of user input/touch command of a graphical element and movement from one section of the display to another section where the graphical element is a card element. The MOX application processes movement of cards (exchange, interact, control, etc.). The application allows for description of card presentation, description of cards and entities (e.g., devices, virtual devices) in user interface, transition of card and/or entities with respect to user actions or spaces, display of cards based on capability matching, selection of which cards to display, user and device avatars, design summary view and detailed view of card, and card comments.

User interface features allow the MOX application to provide functions including hanging cards on devices, controlling devices using cards, borrowing services (e.g., Wi-Fi) using cards, capability sharing (e.g., sharing control of a device), and one or more features built around sharing cards.

In FIG. 4, user interface 400 of the user device 405 has a number of individual features, such as a user row 433 and a device row 431. The user interface also presents an entity list 425. The entity list includes a listing of a plurality of devices or spaces, shown as $410_1$, $410_2$, $410_n$, 430, $420_1$, $420_2$, and $420_n$. In this embodiment, there is no limit to the number of entities in the entity list 425. Some of the entities $410_1$, $410_2$, $410_n$, are connected directly with the user device 405. Some of the entities $420_1$, $420_2$, and $420_n$, are connected to the user device 405 by a communication network. The communication network can be a local network or a more global network, such as the Internet.

The user interface of the user device 405 also presents a plurality of user card elements 434 which are stored on the user row 433. These user card elements 434 are associated with the user device 405. Likewise, the user interface of the user device 405 presents a plurality of device card elements 432 which are stored on the device row 431. These device card elements 432 are associated with a selected third-party device 430. The selected third-party device is one of the plurality of third-party devices which are listed on the entity list 425. The user has the ability to select any third-party device, $410_1$, $410_2$, $410_n$, 430, $420_1$, $420_2$, and $420_n$, and upon selection, the user's choice will become the selected third-party device 430. Once the user has made a choice for the selected third-party device 430, the device row 431 will automatically update such that the device row 431 displays the plurality of device card elements 432 associated with the selected third-party device 430.

According to one embodiment, user interface 400 is presented including graphical elements 434 for one or more card elements in a first portion (e.g., row 433) and graphical elements for one or more devices $410_{1-n}$ and $420_{1-n}$. User inputs (e.g., contact, touch, selection, etc.) may be detected by device 405 as a user interface command to associate a selected card element presented by the user interface with a selected device presented by the user interface 300. FIG. 4 depicts a selected card 436 in a first portion of the user interface. In certain embodiments, the user selection may be a tap, hold and drag to a second portion of the user interface, such as device row 431. The second portion of the user interface may also relate to a tap, hold, and drag to a device (e.g., one or more devices $410_{1-n}$ and $420_{1-n}$). Following the assignment of the card to a device, user interface 400 may update the presentation format.

FIG. 4 also depicts a selected card 436 in a portion of the user interface following card assignment to a device according to an exemplary embodiment. According to one embodiment, selected card element may be assigned to another device, and thus, the application will present a graphical element for the selected card element 436 in row 431. In certain embodiments, assignment of a card element to a device copies the card element to the device, such that a graphical element, such as 437, is still provided in row 433 of the user interface. In other embodiments, assignment of for the selected card element 436 will transfer the selected card element to the device for which graphical elements in row 431 are presented. In such a case, user interface will present graphical element 437 in row 433 which relates to a different card element from selected card element 436. Device 405 may output a communication including an association of the selected card element 436 with the selected device, wherein the association of the selected card with the selected device includes updating metadata for the card element.

Figure 5:
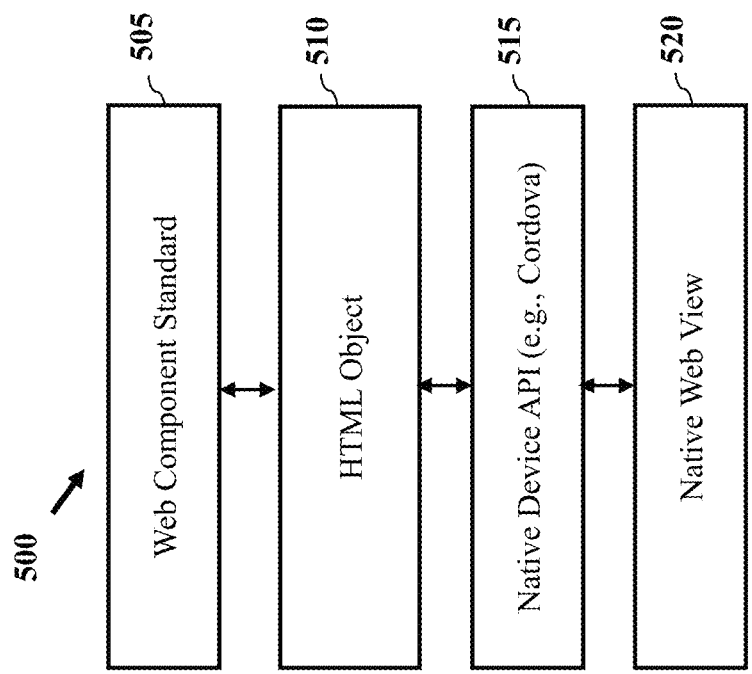
FIG. 5 depicts a graphical representation of a framework file according to one or more embodiments.

FIG. 5 depicts a graphical representation of a framework file 500 according to one or more embodiments. Framework file 500 may be used to quickly load content associated with presentation of a card element within a user interface. In one embodiment, framework file 500 may be used by a device, such as device 105 of FIG. 1A, running an application. Framework file 500 may be configured as a stack of network communication protocols or web components. In certain embodiments, framework file 500 can include one or more layers of protocols, such as cross platform (e.g., network communication protocols) and platform specific (e.g., operating system protocols). Each card element may be configured with a framework file 500 in addition to information particular to the card.

In another embodiment, a framework file 500 may be configured to include a web component standard 505, HTML object 510, native device application program interfaces (API) 515, and native webview component 520.

Web component standard 505 may relate to a set of standards/protocols that allow for the creation of reusable widgets or components in web documents and web applications. Web component standard 505 can package and house card details associated with a card element. Web component standards 505 can also be placed within the canvas of the existing web-page and represent a package of details that can be displayed. In another embodiment, web component standard 505 can include but is not limited to a polymer element.

In one embodiment, HTML object 510 can include web-based content associated with a card element. In another embodiment, HTML object 510 may be a core technology markup language of the Internet used for structuring and presenting content. In certain embodiments, HTML object 510 can include a particular version or type of markup language (e.g., HTML 5).

In one embodiment, a native device API 515 can allow access to device operating function. In another embodiment, native device API 515 allows access to native device functions such as, but not limited to, a camera or accelerometer. Native device API 515 may include Apache Cordova™. Native device API 515 enables software programmers to build applications for mobile devices using JavaScript, HTML5, and CSS3, instead of relying on platform-specific APIs like those in iOS, Windows Phone, or Android.

Native webview 520 is a layout engine software component for rendering web content in web browsers or application. Native webview 520 allows code such as but not limited to HTML, CSS and JavaScript to run in an internal browser.

Figure 6:
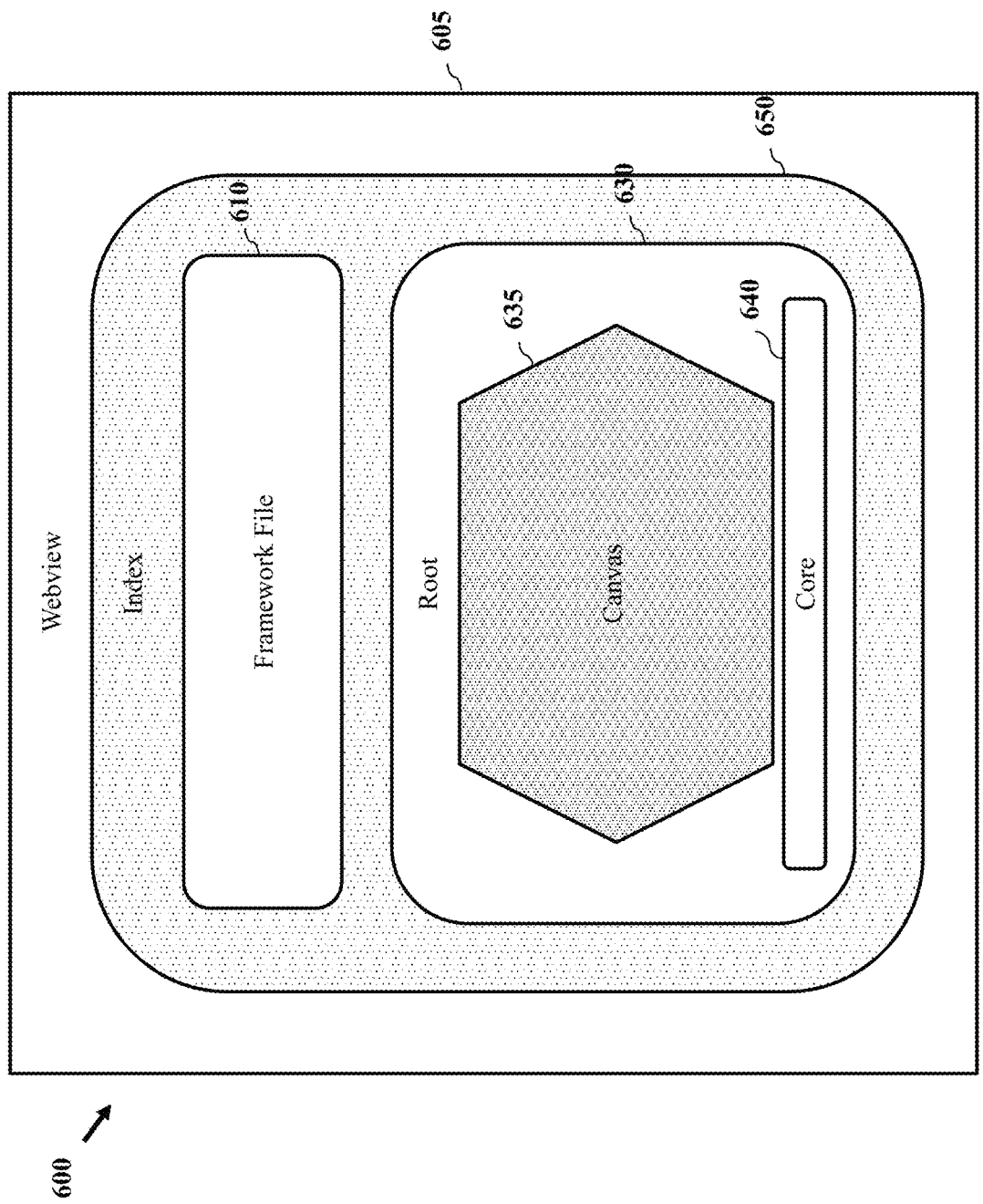
FIG. 6 depicts a graphical representation of a system architecture according to one or more embodiments.

FIG. 6 depicts a graphical representation of an architecture that may be employed for according to one or more embodiments. Architecture 600 may be employed for communication across a network by a plurality of devices. Architecture 600 may employ a framework file to provide quick and dynamic preloading of content associated with a card element. Architecture 600 may be utilized by a device such as device 105 of FIG. 1A. Architecture 600 may be associated with MOX application and can be configured to include native webview 605. In one embodiment, native webview 605 can be layout engine software component for rendering web content in web browsers or an application. In another embodiment, native webview 605 can allow code, such as but not limited to HTML, CSS and JavaScript to run in an internal browser. Native webview 605 can also include index 650.

Index 650 includes a computer file with an index that allows easy random access to any record given its file key. The key must be such that it uniquely identifies a record. If more than one index is present the other indexes are called alternate indexes. In one embodiment, index 650 may relate to the base of a web page configured to hold framework file 610 and root 630.

Framework file 610 is a stack of web components and may include the components described above in FIG. 5. Framework file 610 can include cross-platform and platform specific components. Framework file 610 housed by index 650 allows for quick and dynamic preloading of card element (e.g. framework file and web-based elements) associated with card selection. In another embodiment index 650 may house preloaded framework file 610 associated with a card element prior to card selection or from previous card selection without reloading.

According to one embodiment, root 630 relates to the root holding card-specific web elements, not the root file system of the application. Root 630 can be housed within by index 650. Root 630 is a root directory and is the first or top-most directory in a hierarchy of the file system. In one embodiment, root 630 can include canvas 635 and core 640. According to one embodiment, core 640 can relates to a polymer component (e.g., core-ajax, etc.) used to load other web pages, not the core of the application.

Core 640 is the communication component between system and device or devices. In one embodiment, core 640 can be a native implementation that can be cross complied with a broad spectrum of targets. For example, a single signal from system can be communicated to multiple devices (e.g., mobile phone, television, and appliance) or platforms (e.g., Android, iOS, Windows, Unix, and Linux) with no need to manipulate or translate signal for execution on device or platform. In another embodiment, core 640 can cover all of the key functionality with respect to profiling, capability generation and matching as well as discovery and pairing. Core 640 can also interact with root 630 to thereafter interact with framework file 610 of index 650. In one embodiment, core 640 can include but is not limited to AJAX. AJAX allows updating parts of a web page without reloading the whole page using HTML importing. HTML importing allows content within a card element to be updated with fresh content or data as needed to be displayed on canvas 635. HTML importing of content can be dynamically injected into preloaded framework file 610 during loading based on card element needs. Injecting needed HTML content into preloaded framework file 610 prevents loading of skeleton web framework architecture associated with card element. Instead framework file 610 is already loaded to a native webview 605 and card content are dynamically updated and simultaneously loaded to be displayed on device canvas 635. Novelty or technological advantage is provided in that you can prevent loading of skeleton framework (or card stack) every time a card element is loaded. Card element data can be incorporated into either the part of the stack (cross platform and platform specific) or can be separate.

Figure 7:
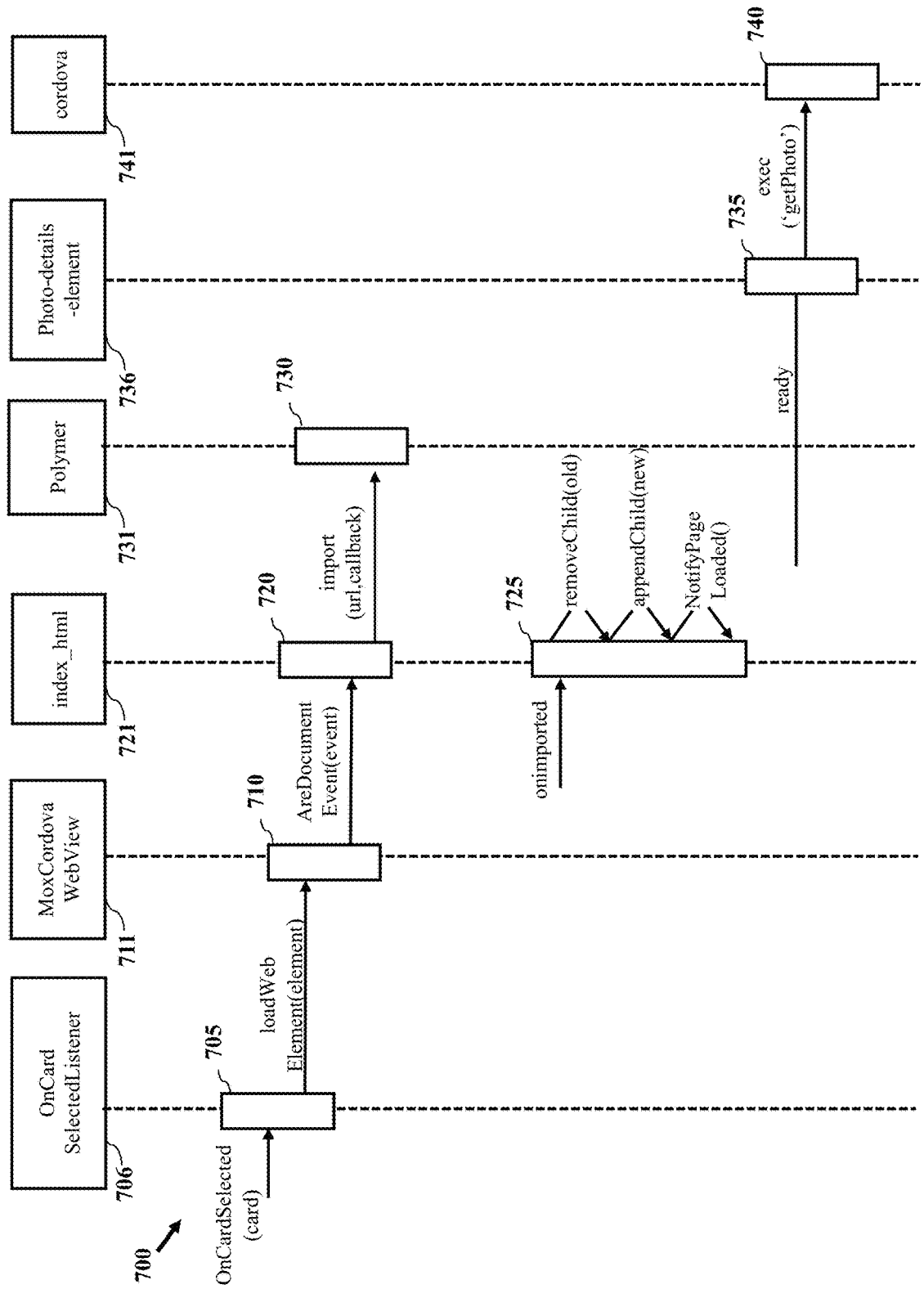
FIG. 7 depicts a process for presentation of a user interface according to one or more embodiments.

FIG. 7 depicts a process for presentation of a user interface according to one or more embodiments. FIG. 7 depicts process 700 for presentation of a user interface according to one or more embodiments. Process 700 may be employed to quickly and dynamically preload card content of an application user interface for presentation on a device or devices. Process 700 may be preformed by a device such as device 105 of FIG. 1A. Process 700 may be configured to detect card selection 705 at block 706; load web element 710 at block 711; detect card event 720 and update web-based element 725 at block 721; import web component standard 730 at block 731; load web-based element 725 with web component standard 730 at block 736; and present content 740 to be displayed on device at block 741.

In one embodiment, card selection 705, loading web element 710, detecting card event 720, importing web component standard 730 relates to importing polymer specific element via JavaScript and Cordova web load and a series of calls.

At block 706, card selection 705 is determined by a user. In another embodiment a card element can be selected by interaction with a card element. Interaction with card elements can be a simple physical (e.g., pushing) selection or input relative to a device. In another embodiment, interaction can also be an interactive gestors such as but not limited to a swipe, pull, and flick. In another embodiment, an interactive gestor can also be voice activation or execution of a verbal or non verbal command such as but not limited to clapping hands together.

At block 711, user provides card selection and thereafter loads web element 710. Loading web element 710 can include detecting a framework file or webstack associated with card selection 705. In another embodiment, loading web element 710 can include detecting a framework file or webstack associated with previous card selection. This action can prevent loading of skeleton framework (or card stack) every time a card element is loaded.

At block 721, device loads web elements and thereafter detects card event 720 and updates web-based element 725. Detecting card event 720 includes identifying user selection 705 of a card element presented by the user interface. In one embodiment, detecting a card element 720 can include identifying a signal associated with card element. A signal can include metadata to determine card selection. In another embodiment, detecting card event 720 and updating web-based element 725 associated with selected card element can be preformed simultaneously. In another embodiment, updating web-based element 725 can be preformed individually. Updating web-based element 725 can include removing old content, providing new content, and loading new content with a series of calls.

At block 731, device detects card event 720 and updates web-based element 725 and thereafter imports web component standard 730 associated with card element. Web component standard 730 is associated to framework file. Web component standard 730 can include but is not limited to a polymer element. Preloading a framework file can include the presentation of local or virtually saved content files. Local content files can reside on the device itself and virtual content are files not locally store but can be quickly accessed for loading. Content files can also include but not limited to a Polymer element placed within the canvas of a native webview. Webview can be persistent with Apache Cordova. Meaning the local or virtual content file can remain loaded in the webview for quick and easy access without loading a full page of content for a card element.

As a web component standard 730 is imported, the updating of web-based element 725 also occurs. Web-based element 725 can be a custom polymer element that loads card elements via Apache Cordova. As discussed in FIGS. 3A-3B, loading card content for a user interface includes updating parts of web page not present in the framework file or webstack. Updating parts of web pages can be accomplished by but not limited to AJAX. AJAX allows updating parts of a web page without reloading the whole page using HTML importing. HTML importing allows content within a card element to be updated with fresh content or data as needed. HTML importing of content can be dynamically injected into preloaded framework file during loading based on card element needs. Injecting needed HTML content into preloaded framework file prevents loading of skeleton web framework architecture associated with card element. Instead framework file is already loaded to a native webview and card content are dynamically updated and simultaneously loaded to be displayed on device.

At block 736, web-based element 725 and web component standard 730 are loaded for presentation of card element 740 to user at block 741. In one embodiment, web-based element 725 and web component standard 730 are loaded simultaneously. In another embodiment, web-based element 725 and web component standard 730 are loaded separately.

In another embodiment, a user can select another card and web-based element 725 is loaded with preloaded web component standard 730 from previous card selection. Finally, the web-based element 725 and web component standard 730 are presented 740 by user interface at block 741 on the device providing a quicker and more responsive load time with minimal latency. As such, loading of skeleton framework (or card stack) every time a card element is loaded is not required, rather component-based dynamic loading may be provided for a hybrid mobile application. Card element data can be incorporated into either the part of the stack (cross platform and platform specific) or can be separate.

Figure 8:
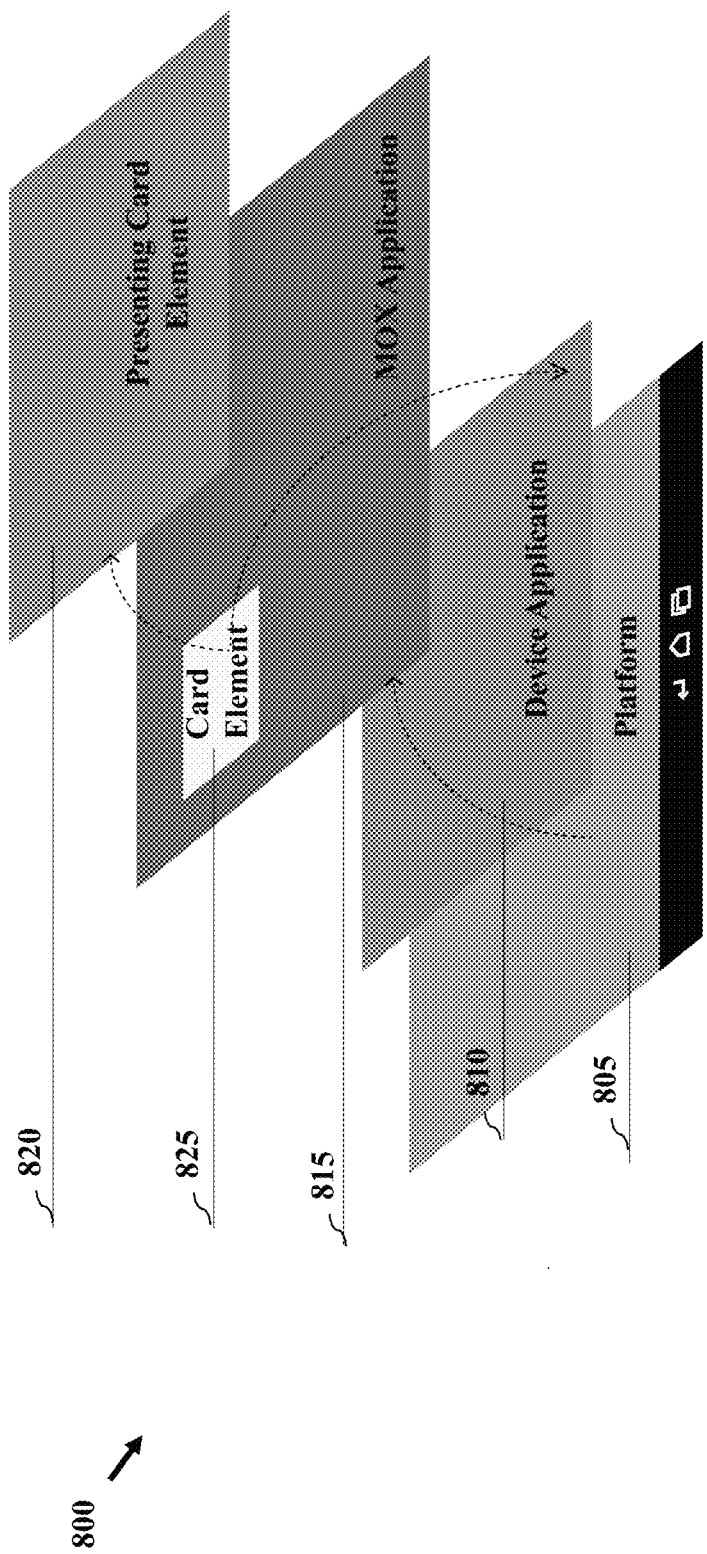
FIG. 8 depicts a graphical representation of card, application and device configuration according to one or more embodiments.

FIG. 8 depicts a graphical representation of card, application and device configuration according to one or more embodiments. FIG. 8 depicts platform layers 800 representing layers that may be employed for a card based application user interface and devices. Platform layers 800 may be implemented and configured for a device such as device 105 of FIG. 1A. Platform layers 800 can be configured to include platform 805. Platform 805 can be an operating system (e.g. iOS, Android, Windows, Unix, and Linux). Platform 805 or operating system is software that manages computer hardware and software resources and provides common services for computer programs. The operating system is an essential component of the system software in a computer system. Application programs usually require an operating system to function.

Device application layer 810 can operate within the platform 805 and may relate to a set of computer programs designed to permit functions, tasks, or activities.

MOX application layer 815 is can operate within the device application 810 to present a user interface with graphical elements to represent entities (e.g., devices, spaces, etc.) and card elements 825. MOX application 815 can graphically display a user interface and graphical elements for one or more card elements 825. In one embodiment, card elements 825 may be displayed by preloading a framework file and also loading web-based elements based on the card content. The framework file can be more then one layer of loading protocols for displaying content associated with a card element for a device. Additionally, preloaded framework file can be used with another card element selection being display to quickly load card content with minimal latency.

Presenting card element 820 relates to graphical display of card element 825 in one or more views. For example, a detail view for a card element can be based on a preloaded framework file while loading new web-based elements content associated with the card element 825 for graphical display. The preloaded framework file can be used for multiple card elements 825 to quickly display card content in detail view with minimal latency. In that fashion, the protocols may be recycled or employed without having to re-load previously loaded protocols. Card elements 825 can be incorporated into either the part of the stack (e.g., cross platform and platform specific) or can be separate.

Figure 9:
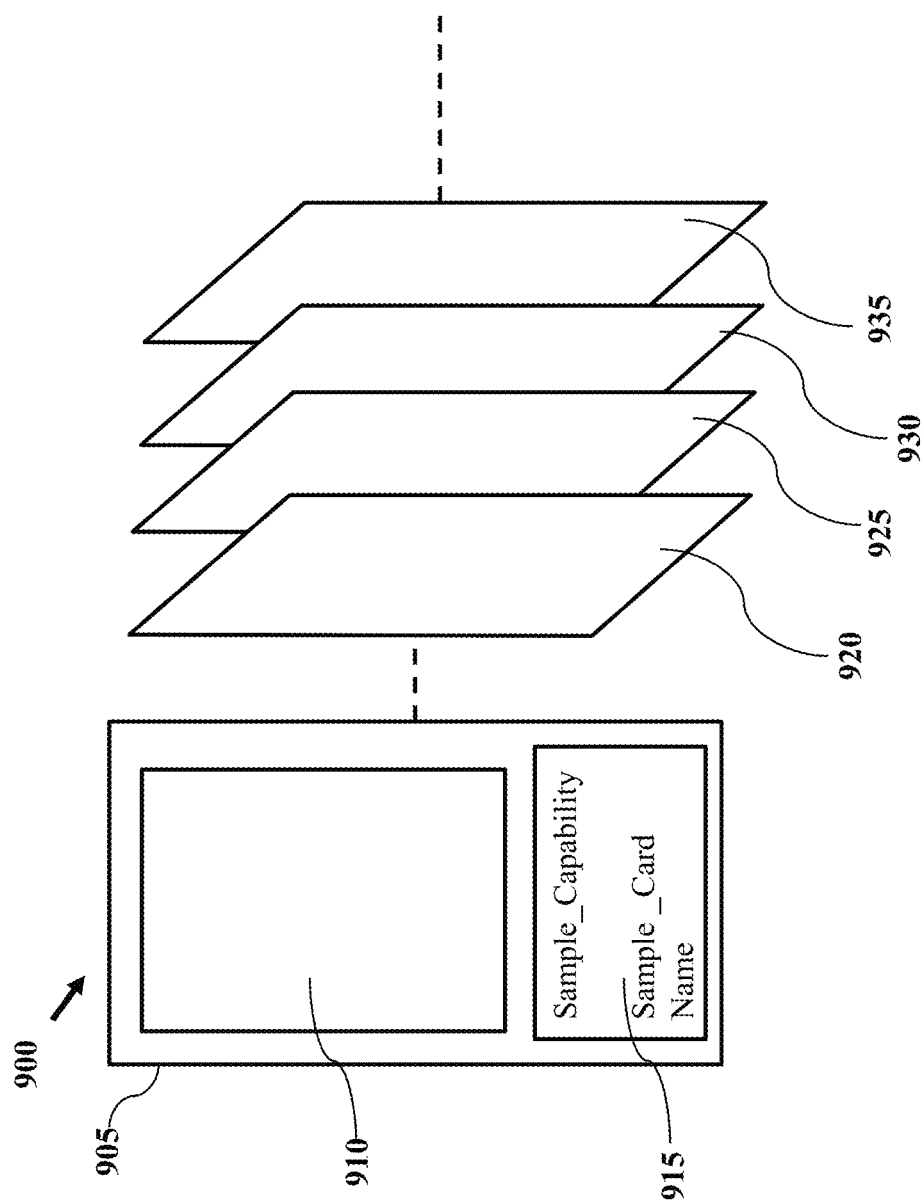
FIG. 9 depicts a graphical representation of card configuration according to one or more embodiments.

FIG. 9 depicts a graphical representation of card configuration according to one or more embodiments. Card element 900 may include several layers to allow for the card element to function and be used within an application where layers of the card have a different function. FIG. 9 depicts an exemplary representation of card element 900 as may be displayed. By way of example card element 900 may be displayed as graphical element 905 which includes image 910 and description 915. Image 910 may be specified by a user of the application or generated by the application. Image 910 may be employed to identify the card element. Description 915 may be user specified or similarly defined by the application. Description 915 may provide a name, type, and/or brief description of the card element 900 in text.

Presentation of card element 900 as graphical element 905 may employ interface layer 920 to define the graphical elements (e.g., image 910, description 915, etc.). Interface layer 920 may provide the user interface graphical elements that enables presentation but also reduce the amount of data to be processed (as opposed to the entire card) in order to present graphical elements for display of card element 900. HTML layer 925 can provide one or more web-based protocols or formatting. JavaScript layer 930 can include web-based elements can include but are not limited to CSS, JavaScript, and HTML5. Metadata layer 935 (e.g., JSON) can relate to metadata associated with the card that may define the card type, card content, card functionality, etc. According to one embodiment one or more layers of card element 900 may be pre-loaded for interoperation with a user interface of an application. It should be appreciated that card element 900 may include one or more additional or different layers.

Card element 900 may be presented as a summary view and/or a detailed view. The summary view can include content associated with pre-loading of a framework file and interface layer 920. Summary view can include a brief description of content associated with the card element 900. In another embodiment, preloaded framework file can be used for displaying content associated with card element 900 for a detailed view within the application.

Figure 10:
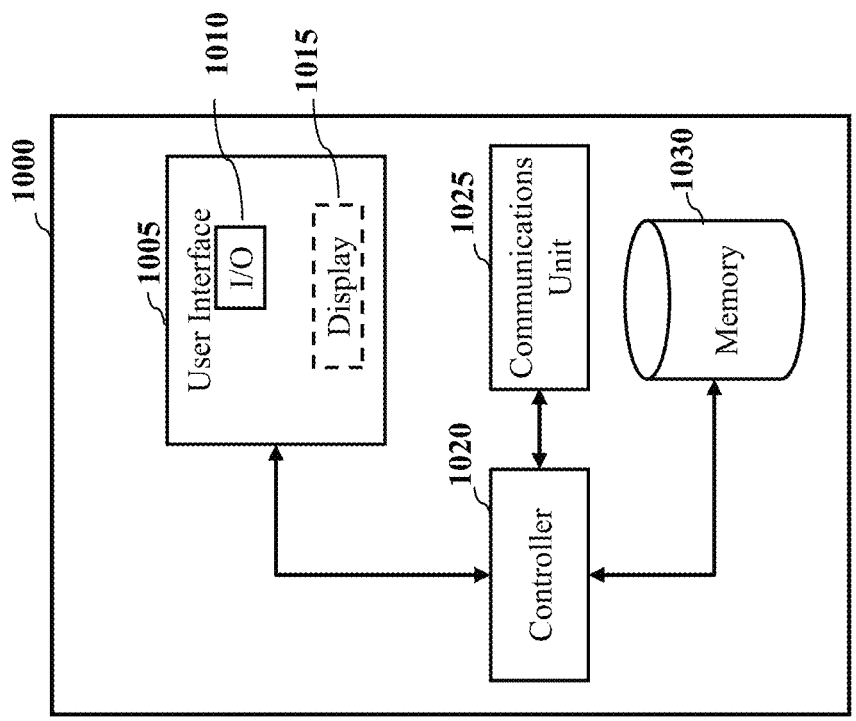
FIG. 10 depicts a simplified diagram of a device according to one or more embodiments.

FIG. 10 depicts a simplified diagram of a device according to one or more embodiments. Device 1000 may relate to one or more devices for providing an application, such as a MOX application. According to another embodiment, device 1000 may relate to one or more devices configured to run a MOX core. In one embodiment, device 1000 relates to a device including a display, such as a TV, mobile device, or device having a display in general. According to another embodiment, device 1000 may be devices, such as a set-top box, configured to output content to a display device. According to another embodiment, device 1000 may be devices without a display. As shown in FIG. 10, device 1000 includes controller 1005, graphical user interface 1010, communications unit 1015 and memory 1020.

Controller 1005 may be configured to execute code stored in memory 1020 for operation of device 1000 including presentation of a graphical user interface. Controller 1005 may include a processor and/or one or more processing elements. In one embodiment controller 1005 may be include one or more of hardware, software, firmware and/or processing components in general. According to one embodiment, controller 1005 may be configured to perform one or more processes described herein. Graphical user interface 1010 may be configured to receive one or more commands via an input/output (I/O) interface 1025 which may include one or more inputs or terminals to receive user commands. When device 1000 relates to a TV, I/O interface 1025 may receive one or more remote control commands.

Controller 1005 may be configured to run a MOX application, the MOX application including one or more card elements, restful APIs, a MOX core and a MOX configuration.

Communications unit 1015 may be configured for wired and/or wireless communication with one or more network elements, such as servers. Memory 1020 may include non-transitory RAM and/or ROM memory for storing executable instructions, operating instructions and content for display.

Figure 11:
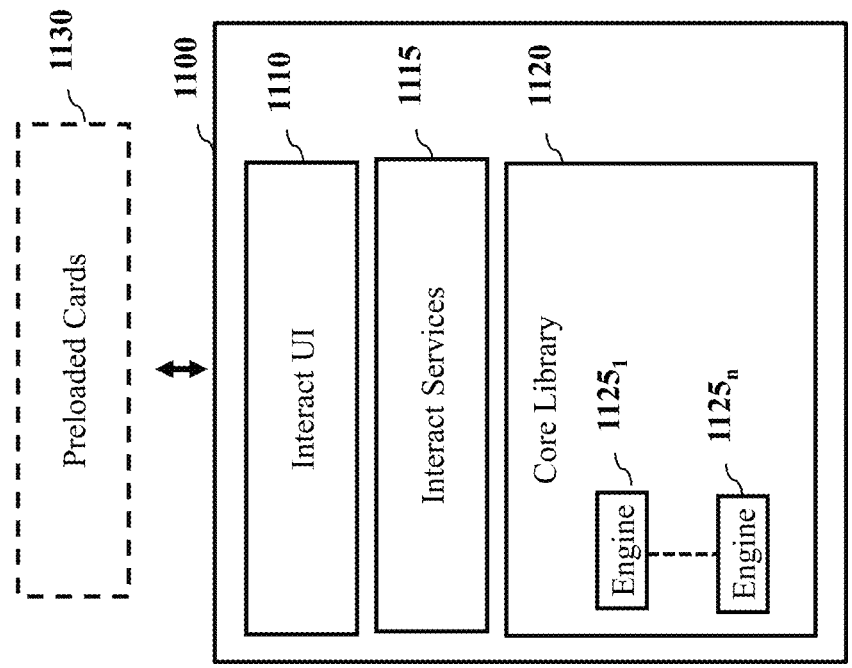
FIG. 11 depicts a graphical representation of elements/layer of an application according to one or more embodiments.

FIG. 11 depicts a graphical representation of elements/layers of an application according to one or more embodiments. In one embodiment an application as discussed herein, such as a MOX application, may be configured with one or more services/functionalities and a portable core. FIG. 11 depicts application 1100 and core elements of application 1100. According to one embodiment, application 1100 includes and interact user interface (UI) element 1110, interact services element 1115 and core library 1120. Application 1100 may be configured to run including one or more card elements, restful APIs, a MOX core 1120 and a MOX configuration.

According to one embodiment, devices may be configured to run a MOX Application based on the device type. As such, application 1100 and core computing structures may be configured for high and/or low interactive devices. Application 1100 may be configured to operate with a particular platform (e.g., android, operating system, etc.) and/or may be embedded with or without head Linux devices.

According to one embodiment, application 1100 can leverage and interoperate with existing technologies that already handle various functions, including matching capabilities by displaying complementary endpoints between devices. A capability card is only shown when two complementary functions are available, such as in DLNA (A controller and a renderer).

Interact user interface (UI) element 1110 may be a layer associated with presentation of a user interface. Certain devices may include displays and utilize a user interface for presentation of a MOX application. Accordingly, UI element 1110 may be configured to present a user interface, such as the user interface described herein for presentation of card elements, exchange of card elements and interaction with a user. For devices without a display or input/output, UI element 1110 may not be required to execute the MOX application. Accordingly, in that embodiment the MOX application may be loaded without the UI element 1110. UI element 1110 may provide smooth transparent interaction for application 1100. UI element 1110 may leverage native platform permissions to support presentation of the user interface. For example a native application service layer manager may bridge between the high level UI, and the low level system components. Interact services element 1115 may be responsible for the services and device interaction. Interact services element 1115 may contain the relevant logic to handle multiple devices.

Interact services element 1115 may be a layer associated with interaction between one or more MOX devices. Certain devices may be configured to discovery and interact with other devices using a MOX application. Interact services element 1115 may provide each devices its capabilities. By way of example, the application 1100 may be configured to notify the ecosystem and/or one or more devices associated with application 1100 when there is something to communicate. Devices associated with application 1100 can respond instantly when requested to take action. Devices within the ecosystem can be shared at the capability level.

Core library 1120 can include one or more engines 1125$_{1-n}$ configured to provide functionality or handling of data and actions within the application. According to one embodiment, core library 1120 can include one or more engines 1125$_{1-n}$ associated with at least one of a Discovery & Pairing Engine, Capability Matching Engine, Dynamic Capability Engine, and Profiling Engine. Core library 1120 can allow for the MOX application to run on both high and low level devices, including devices with user interfaces, processors and controllers, such as controllers for appliances. Core library 1120 can support multiple device types. According to one embodiment, core library 1120 does not require a particular platform to be executed, and thus, is portable for operation on many different types of platforms.

In one embodiment, application 1100 is configured with a capability matching engine to compare capabilities from a current device (e.g., device executing the MOX application 1100) and remote devices. The capability matching engine can determine complementary endpoints and functions. In certain embodiments, only complementary endpoints are presented to the upper layers of the application 1100.

In one embodiment, application 1100 is configured with a dynamic capability engine layer to automatically discover the capabilities of the device upon which it is running. The dynamic capability engine layer can support both dynamic discovery of capabilities, and a configuration file based method to support deeply integrated products.

In one embodiment, application 1100 is configured with a profiling engine layer to provide a device's identity. Rather than being a nameless device, the profiling engine layer can ensure a unique identity to the device application 1100 is running on.

In certain embodiments, the application 1100 can operate with preloaded card elements 1130. Preloaded card elements 1130 can relate to one or more card elements that are associated with a device. In that fashion the card elements may be preloaded to operate with the device without requiring loading from a server.

In certain embodiments, application 1100, and a MOX application as described herein, can include one or more security features. According to one embodiment, devices running application 1100 are configured with standard remote and guest access policies designed for security. These policies can be controlled or modified by a user based on individual needs through an interface that would allow dragging one API from the local/authenticated, or "All APIs" pool, to either the "Remote APIs" or the Guest APIs" pools. In one embodiment, an Authenticated/Local configuration can provide full API access and control to authenticated and/or remote devices. In addition, there may be a remote class API access and control setting. In one embodiment, a Not Authenticated/Local configuration provides limited local class API access and control. In one embodiment, a Not Authenticated/Remote configuration provides no access or control. According to other embodiments and with respect to API's in different zones, only a portion of a given API set would be available remotely. This can be reconfigured by from the defaults. APIs that would not be available remotely would fall into the categories of safety concerns and interactive limitations.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presentation of card content by a user interface, the method comprising:

presenting, by a device, a user interface configured to present a graphical user interface for display on a device including graphical elements for one or more card elements, the one or more card elements including a first graphical element and a second graphical element;

detecting, by the device, selection of the first graphical element presented by the user interface;

loading, by the device, a framework file for presentation of content associated with the first graphical element, wherein the first graphical element is associated with a first card element configured to be presented based on the framework file and card content for the first graphical element, and wherein the device loads card content for the first graphical element with the framework file, wherein the framework file is configured to load content associated with presentation of card elements within the user interface;

displaying, by the device, content associated with the first graphical element using the framework file, wherein presentation of the first graphical element includes using an interface layer of the first card element to define an image and description for the first card element, and a metadata layer including card content for the card element;

detecting, by the device, selection of second graphical element presented by the user interface, wherein the second graphical element is associated with a second card element;

importing, by the device, elements of the second graphical element for the user interface in response to the selection of the second graphical element, wherein importing includes injecting content of the second graphical element into the framework file loaded for presentation of the first graphical element and importing is based on card element needs of the second graphical element; and presenting, by the device, card content for the second graphical element based on the framework file and the importing, wherein the device loads card content for the second graphical element into the framework file already loaded for presentation of the user interface, updates card content not in the framework file and the device prevents reloading of the framework file.

2. The method of claim 1, wherein the user interface is presented for an application configured for at least one of presentation, interaction and exchange of card elements within the application.

3. The method of claim 1, wherein card elements are configured to include at least one of content and functionality.

4. The method of claim 1, wherein the selection of a first graphical element presented by a user interface includes an input command to access content associated with the card element.

5. The method of claim 1, wherein loading the framework file includes loading one or more network protocols for communication relative to a communication network.

6. The method of claim 1, wherein the framework file includes cross-platform and platform protocols.

7. The method of claim 1, wherein the framework file is executed by the device to enable network communication and interoperation with a platform of the device.

8. The method of claim 1, wherein selection of the second graphical element is an interaction within the user interface to access content of the second card element.

9. The method of claim 1, wherein presenting content for the second card element includes importing content associated with the second card element into the framework file to display content associated with second card element for a detailed view of the second card element within the user interface.

10. The method of claim 1, wherein the second card element is associated with remote device accessible to the device by way of the application.

11. A method for presentation of card content by a user interface, the method comprising:

presenting, by a device, a user interface including graphical elements for one or more card elements, the one or more card elements including a first graphical element and a second graphical element;

identifying, by the device, a framework file for presentation of the graphical elements associated with the one or more card elements, wherein each card element is configured to be accessed based on the framework file and card content;

preloading, by the device, the framework file for presentation of content associated with the first graphical element, wherein the device loads card content for the first graphical element with the framework file, wherein the framework file is configured to load content associated with presentation of card elements within the user interface;

displaying, by the device, content associated with the first graphical element using the framework file in response to the preloading, wherein presentation of the first graphical element includes using an interface layer of the first card element to define an image and description for the first card element, and a metadata layer including card content for the card element;

detecting, by the device, a selection of a second graphical element of a card element presented by the user interface, wherein the second graphical element is associated with a second card element;

importing, by the device, elements of the second graphical element for the user interface in response to the selection of the second graphical element, wherein importing includes injecting content of the second graphical element into the framework file loaded for presentation of the first graphical element and importing is based on card element needs of the second graphical element; and displaying, by the device, card content for the second graphical element based on the framework file and the importing, wherein the device loads card content for the second graphical element into the framework file already loaded, updates card content not in the framework file and prevents reloading of the framework file.

12. The method of claim 11, wherein card elements are configured to include at least one of content and functionality.

13. The method of claim 11, wherein the selection of a card element presented by a user interface includes an input command to access content associated with the card element.

14. The method of claim 11, wherein loading the framework file includes loading one or more network protocols for communication relative to a communication network.

15. The method of claim 11, wherein the framework file includes cross-platform and platform protocols.

16. The method of claim 11, wherein the framework file is executed by the device to enable network communication and interoperation with a platform of the device.

17. The method of claim 11, wherein the second card element is associated with remote device accessible to the device by way of the application.

18. A device comprising:
a display configured for presentation of a user interface; and
a controller coupled to the display, the controller configured to
    present a user interface configured to present a graphical user interface for display on the device including graphical elements for one or more card elements, the one or more card elements including a first graphical element and a second graphical element
    detect selection of the first graphical element presented by a user interface;
    load a framework file for presentation of content associated with the first graphical element, wherein the first graphical element is associated with a card element configured to be presented based on the framework file and card content for the first graphical element, and wherein the device loads card content for the first graphical element with the framework file, wherein the framework file is configured to load content associated with presentation of card elements within the user interface;
    display content associated with the first graphical element using the framework file, wherein presentation of the first graphical element includes using an interface layer of the first card element to define an image and description for the first card element, and a metadata layer including card content for the card element;
    detect selection of second graphical element presented by the user interface, wherein the second graphical element is associated with a second card element; and
    import elements of the second graphical element for the user interface in response to the selection of the second graphical element, wherein importing includes injecting content of the second graphical element into the framework file loaded for presentation of the first graphical element and importing is based on card element needs of the second graphical element;
    present card content for the second graphical element based on the framework file and the importing, wherein the device loads card content for the second graphical element into the framework file already loaded for presentation of the user interface and updates card content not in the framework file and the device prevents reloading of the framework file.

19. The device of claim 18, wherein presenting content for the second card element includes importing content associated with the second card element into the framework file to display content associated with second card element for a detailed view of the second card element within the user interface.

* * * * *